Aug. 17, 1926.

J. GARLICK 1,596,484

BEARING FOR ENGINE VALVE

Filed Feb. 11, 1922

J. Garlick, Inventor

Patented Aug. 17, 1926.

1,596,484

UNITED STATES PATENT OFFICE.

JEW GARLICK, OF PATERSON, NEW JERSEY.

BEARING FOR ENGINE VALVES.

Application filed February 11, 1922. Serial No. 535,867.

This invention aims to provide a novel bearing for the valve of an internal combustion engine.

In the accompanying drawings:—

Figure 1:
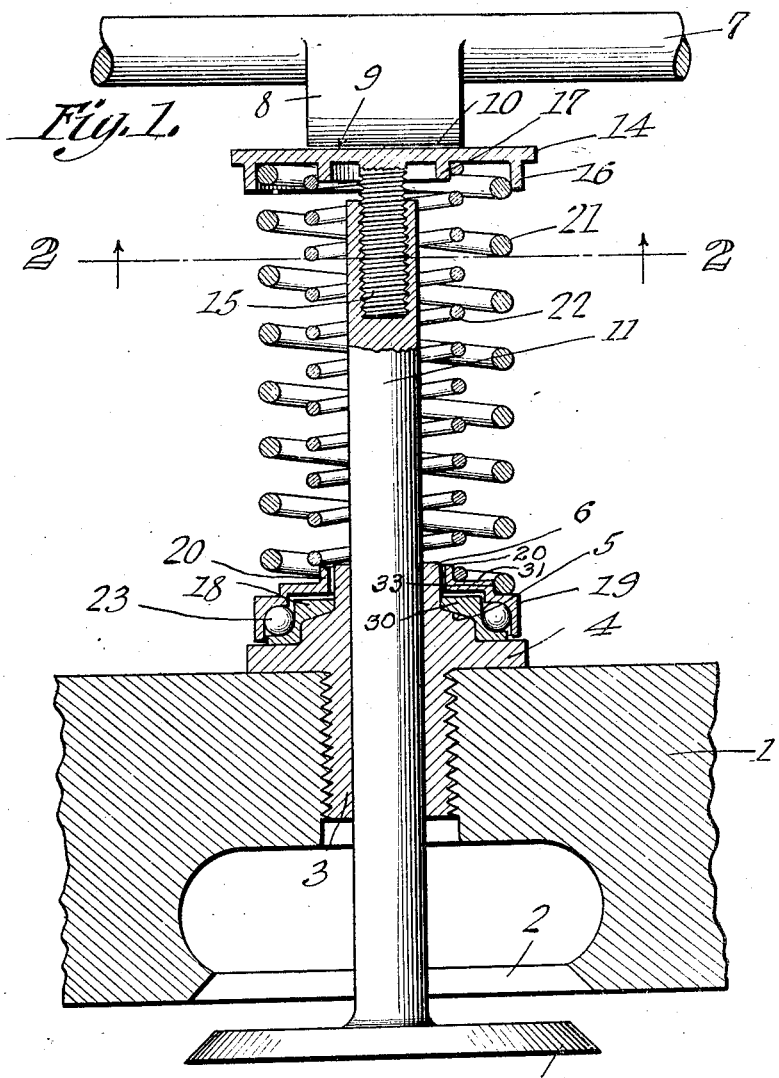
Figure 2:
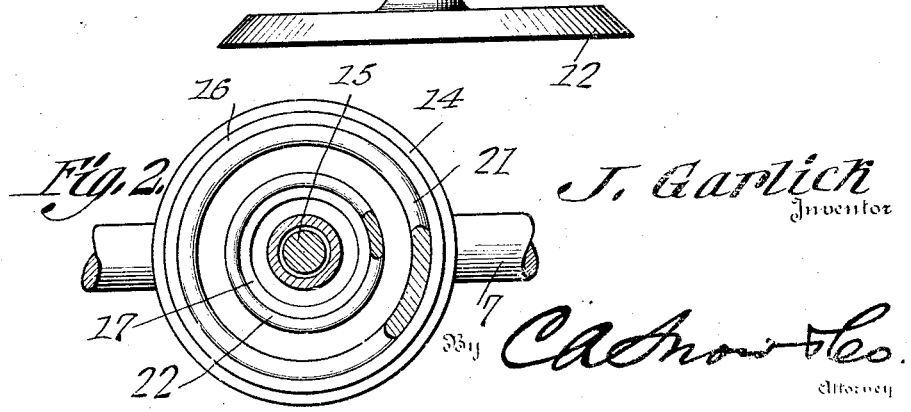

Figure 1 shows in section, a device constructed in accordance with the invention, parts appearing in elevation; Figure 2 is a cross section on the line 2—2 of Figure 1.

The numeral 1 denotes the frame of an engine, having a seat 2. The frame 1 may carry a tubular guide 3 provided with a flange 4 engaging the frame the guide including a shoulder 5 and a neck 6 projecting from the shoulder. The cam shaft is shown at 7 and carries a cam 8 which may be cut away at 9, to define a projection 10.

A stem 11 is slidable in the guide 3 and carries a valve 12 adapted to cooperate with the seat 2. The numeral 14 designates a head, which may be connected by a threaded stem 15, or otherwise, with the valve stem 11. The head 14 has an outer annular flange 16 and an inner annular flange 17.

A race 18 is supported on the flange 4 of the guide 3, the race surrounding the shoulder 6 and extending inwardly over the same, as clearly shown in Figure 1 of the drawings. The numeral 19 denotes a race, shaped to correspond with the outline of the race 18, and including a sleeve 20 located about the neck 6 of the guide 3. An outer spring 21 abuts against the head 14 and is located within the flange 16, the spring 21 engaging the ball race 19. An inner spring 22 is provided, the same surrounding the flange 17 on the head 14 and abutting against the head. The spring 22 abuts against the race 19. Balls 23 or other antifriction elements are located between the races 18 and 19.

By way of summary, it may be stated that the device forming the subject matter of this application is characterized patentably by the provision of a support 1, a tubular guide 3 mounted in the support 1, and having a lateral flange 4 engaging the outer surface of the support 1, the guide 3 including a shoulder 5 and a neck 6 projecting from the shoulder 5, a first race 18 supported on the flange 4 of the guide 3, the race 18 surrounding the shoulder 5 and comprising a member 30 extended inwardly over the shoulder 5 and about the neck 6, a second race 19 shaped to correspond with the general cross sectional contour of the first race 18 and including an inwardly extended portion 31 disposed about the neck 6 and having inner (20) and outer (33) concentric parts, balls 23 between the races 18 and 19, inner (22) and outer (21) compression springs abutting against the second race 19 and engaged, respectively, closely about said inner (20) and outer (33) concentric parts of the second race 19, to hold said springs 22 and 21 centered with respect to each other, the inner spring 22 being lighter than the outer spring 21—the inner spring 22 abutting against the second race 19 in close relation to the neck 6, and the outer spring 21 abutting against the second race 19 in substantial alinement with the balls 23 but outwardly of the centers of the balls 23, thereby to prevent said inwardly extended portion 21 of the second race 19 from being tilted forward and into engagement with the inwardly extended member 30 of the first race 18.

What is claimed is:—

In a device of the class described, a support, a tubular guide mounted in the support and having a lateral flange engaging the outer surface of the support, the guide including a shoulder and a neck projecting from the shoulder, a first race supported on the flange of the guide, the race surrounding the shoulder and comprising a member extended inwardly over the shoulder and about the neck, a second race shaped to correspond with the general cross sectional contour of the first race and including an inwardly extended portion disposed about the neck and having inner and outer concentric parts, balls between the races, inner and outer compression spring abutting against the second race and engaged, respectively, closely about said inner and outer concentric parts of the second race, to hold said springs centered with respect to each other, the inner spring being lighter than the outer spring—the inner spring abutting against the second race in close relation to the neck, and the outer spring abutting against the second race in substantial alinement with the balls, but outwardly of the centers of the balls, thereby to prevent said inwardly extended portion of the second race from being tilted toward and into engagement with the inwardly extended member of the first race.

In testimony that I claim the foregoing as my own, I have hereto affixed my signature.

JEW GARLICK.